(12) United States Patent
Arsovski et al.

(10) Patent No.: US 9,171,125 B2
(45) Date of Patent: Oct. 27, 2015

(54) LIMITING SKEW BETWEEN DIFFERENT DEVICE TYPES TO MEET PERFORMANCE REQUIREMENTS OF AN INTEGRATED CIRCUIT

(71) Applicant: INTERNATIONAL BUSINESS MACHINES CORPORATION, Armonk, NY (US)

(72) Inventors: Igor Arsovski, Williston, VT (US); Jeanne P. Bickford, Essex Junction, VT (US); Mark W. Kuemerle, Essex Junction, VT (US)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 103 days.

(21) Appl. No.: 14/190,723

(22) Filed: Feb. 26, 2014

(65) Prior Publication Data

US 2015/0242560 A1  Aug. 27, 2015

(51) Int. Cl.
*G06F 17/50* (2006.01)
(52) U.S. Cl.
CPC ........ *G06F 17/5081* (2013.01); *G06F 17/5031* (2013.01); *G06F 2217/84* (2013.01)
(58) Field of Classification Search
CPC ............ G06F 17/5031; G06F 17/5081; G06F 2217/84
USPC .................. 716/110–111, 113, 132, 134, 136
See application file for complete search history.

(56) References Cited

U.S. PATENT DOCUMENTS

| | | | |
|---|---|---|---|
| 7,093,208 B2 | 8/2006 | Williams et al. | |
| 7,475,366 B2 | 1/2009 | Kuemerle et al. | |
| 7,653,888 B2 | 1/2010 | Habib et al. | |
| 7,810,054 B2 | 10/2010 | Anemikos et al. | |
| 7,877,714 B2 | 1/2011 | Anemikos et al. | |
| 7,884,599 B2 | 2/2011 | Habib et al. | |

(Continued)

FOREIGN PATENT DOCUMENTS

| | | |
|---|---|---|
| WO | 2008134222 | 11/2008 |
| WO | WO 2008134222 A2 * | 11/2008 |

OTHER PUBLICATIONS

Glenn Cowan et al.,"Method for adjusting circuit topology dependent on process measurement" IBM IPCOM000159622D Oct. 22, 2007,8 pages.

(Continued)

*Primary Examiner* — Stacy Whitmore
(74) *Attorney, Agent, or Firm* — David Cain; Roberts Mlotkowski Safran & Cole, P.C.

(57) ABSTRACT

Methods and systems are provided for that are designed to impose an n-type to p-type device skew constraint that is beyond what normal technology limits allow in order to operate semiconductor devices at lower voltages while still achieving a similar performance at a lower power. More specifically, a method is provided for that includes setting device skew requirements for at least one library element, setting device skew test dispositions for the at least one library element based on the set device skew requirements, designing the at least one library element using device skew assumptions, fabricating the at least one library element on a product that includes at least one device skew monitor, determining an actual device skew of the fabricated at least one library element using the at least one device skew monitor, and determining whether the fabricated product meets target specifications.

20 Claims, 10 Drawing Sheets

(56) References Cited

U.S. PATENT DOCUMENTS

| | | | |
|---|---|---|---|
| 8,141,012 | B2 | 3/2012 | Buck et al. |
| 8,214,787 | B1 | 7/2012 | Reis |
| 8,234,511 | B2 | 7/2012 | Lopata |
| 8,249,819 | B1 | 8/2012 | Treichler et al. |
| 8,302,064 | B1 | 10/2012 | Sadoughi et al. |
| 8,966,431 | B2* | 2/2015 | Bickford et al. ............ 716/134 |
| 2008/0034337 | A1 | 2/2008 | Kuemerle et al. |
| 2008/0189671 | A1 | 8/2008 | Habib et al. |
| 2008/0222584 | A1 | 9/2008 | Habib et al. |
| 2008/0270954 | A1 | 10/2008 | Habib et al. |
| 2009/0083690 | A1* | 3/2009 | Habib et al. .................. 716/18 |
| 2009/0217221 | A1 | 8/2009 | Anemikos et al. |
| 2009/0228843 | A1 | 9/2009 | Anemikos et al. |
| 2010/0174503 | A1* | 7/2010 | Balch et al. ................... 702/79 |
| 2011/0055793 | A1 | 3/2011 | Buck et al. |
| 2011/0106497 | A1 | 5/2011 | Visweswariah et al. |
| 2012/0117527 | A1 | 5/2012 | Hemmett et al. |
| 2012/0327725 | A1 | 12/2012 | Clark et al. |
| 2014/0047402 | A1* | 2/2014 | Terayama et al. ............ 716/108 |
| 2015/0084212 | A1* | 3/2015 | Chen ............................ 257/786 |

OTHER PUBLICATIONS

Vladimir Zolotov et al.,"Voltage Binning Under Process Variation", IEEE/ACM International Conference on Computer-Aided Design Digest of Technical Papers, 2009, 8 pages.

Susan Lichtensteiger et al., "Using Selective Voltage Binning to Maximize Yield", Advance Semiconductor Manufacturing Conference (ASMC), 2012, 4 pages.

Bickford et al., "Method and Structure for Multi-Core Chip Product Test and Selective Voltage Binning Disposition" U.S. Appl. No. 13/553,986, filed Jul. 20, 2012, 20pages.

\* cited by examiner

LIMITING SKEW BETWEEN DIFFERENT DEVICE TYPES TO MEET PERFORMANCE REQUIREMENTS OF AN INTEGRATED CIRCUIT

FIELD OF THE INVENTION

The invention relates to integrated circuit designs and, more particularly, to methods and systems that are designed to impose an n-type to p-type device skew constraint that is beyond what normal technology limits allow in order to operate semiconductor devices at lower voltages while still achieving a similar performance at a lower power.

BACKGROUND

The conventional design of some library elements (e.g., memory) or products (e.g., application-specific integrated circuits (ASIC) chips) that are designed for newer technology nodes (e.g., 22 nm technology) typically cannot meet performance or functionality requirements at technology minimum or lower voltages. Consequently, the conventional design methods and systems redesign these library elements or products to meet performance requirements at the technology minimum or lower supply voltages using a modulation of a device threshold voltage (e.g., using a lower threshold voltage improves conductivity at the lower supply voltage) of at least one semiconductor switching element (e.g., a field effect transistor) on the library elements or products. The threshold voltage of a switching element is the value of the gate-source voltage when the conducting channel begins to connect the source and drain contacts of the switching element, allowing significant current. The threshold voltage may be dependent upon a number of design constraints including implant type in the channel region, channel sizes, and oxide thicknesses. Accordingly, the conventional modulation of the threshold voltage may include redesigning or altering the doping, the channel size, or the oxide thickness of the switching element.

The use of modulated or lower threshold voltage assists in the switching of the at least one semiconductor switching element on the library elements or products at a faster rate such that the library elements or products meet performance or functionality requirements at technology minimum or lower voltages. However, the use of the modulated or lower threshold voltages in conventional redesigns results in a substantial increase of leakage current, which causes the redesigned devices to require higher power to replace the leaked current and achieve the assisted switching. The increased leakage current and power requirements may also generate heat as the current leaks away, which leads to degraded performance for the redesigned devices.

SUMMARY

In a first aspect of the invention, a method is provided for that includes setting device skew requirements for at least one library element. The method further includes setting device skew test dispositions for the at least one library element based on the set device skew requirements. The method further includes designing the at least one library element using device skew assumptions that are based on the set device skew requirements. The method further includes fabricating the at least one library element on a product that includes at least one device skew monitor. The method further includes determining an actual device skew of the fabricated at least one library element using the at least one device skew monitor. The method further includes determining whether the fabricated product meets target specifications based on a comparison of the determined actual device skew to the set device skew test dispositions.

In another aspect of the invention, a method is provided for that includes setting device skew requirements for at least one library element by process window bin. The method further includes setting device skew test dispositions for each process window bin based on the set device skew requirements. The method further includes designing the at least one library element using device skew assumptions that are based on the set device skew requirements. The method further includes fabricating the at least one library element on a product that includes at least one performance monitor and at least one device skew monitor. The method further includes setting a process window bin for the fabricated product using a performance measured by the at least one performance monitor. The method further includes determining an actual device skew of the fabricated at least one library element using the at least one device skew monitor. The method further includes determining whether the fabricated product meets target specifications based on a comparison of the determined actual device skew to the set device skew test disposition for the set process window bin.

In yet another aspect of the present invention, a system is provided for that includes a CPU, a computer readable memory and a computer readable storage media. The system further includes program instructions to set device skew requirements for at least one library element. The system further includes program instructions to set device skew test dispositions for the at least one library element based on the set device skew requirements. The system further includes program instructions to design the at least one library element using device skew assumptions that are based on the set device skew requirements. The system further includes program instructions to fabricate the at least one library element on a product that includes at least one device skew monitor. The system further includes program instructions to determine an actual device skew of the fabricated at least one library element using the at least one device skew monitor. The system further includes program instructions to determine whether the fabricated product meets target specifications based on a comparison of the determined actual device skew to the set device skew test dispositions. The program instructions are stored on the computer readable storage media for execution by the CPU via the computer readable memory.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates to integrated circuit designs and, more particularly, to methods and systems that are designed to impose an n-type to p-type device skew constraint that is beyond what normal technology limits allow in order to operate semiconductor devices at lower voltages while still achieving a similar performance at a lower power. Embodiments of the present invention use a manufacturing screen or line tailoring to limit skew between integrated circuit devices (e.g., p-type and n-type devices) such that the library elements or products are capable of meeting performance requirements (e.g., minimum voltage requirements for a given technology node) without having the overhead costs associated with modifying the integrated circuit and the additional problems introduced into the integrated circuit that may result from such modification (e.g., increase leakage current and higher power requirements). More specifically, implementations of the present invention provide a method for setting device skew requirements, designing library elements or products using device skew assumptions, monitoring the device skew in manufactured library elements or products, optionally binning or separating the manufactured library elements or products based on process limitations or skew limitations, and shipping those library elements or products that meet the device skew requirements.

Advantageously, the systems and methods described herein for designing, monitoring, and shipping library elements and products allows for designers or manufacturers to control device skew such that those library elements or products that are capable of achieving lower voltages or minimum voltage requirements while still achieving a similar performance at a lower power are shipped to customers. Advantageously, the systems and methods also improve the timing of the library elements and products such that the closing of timing becomes easier than in conventional methodologies.

Figure 1:
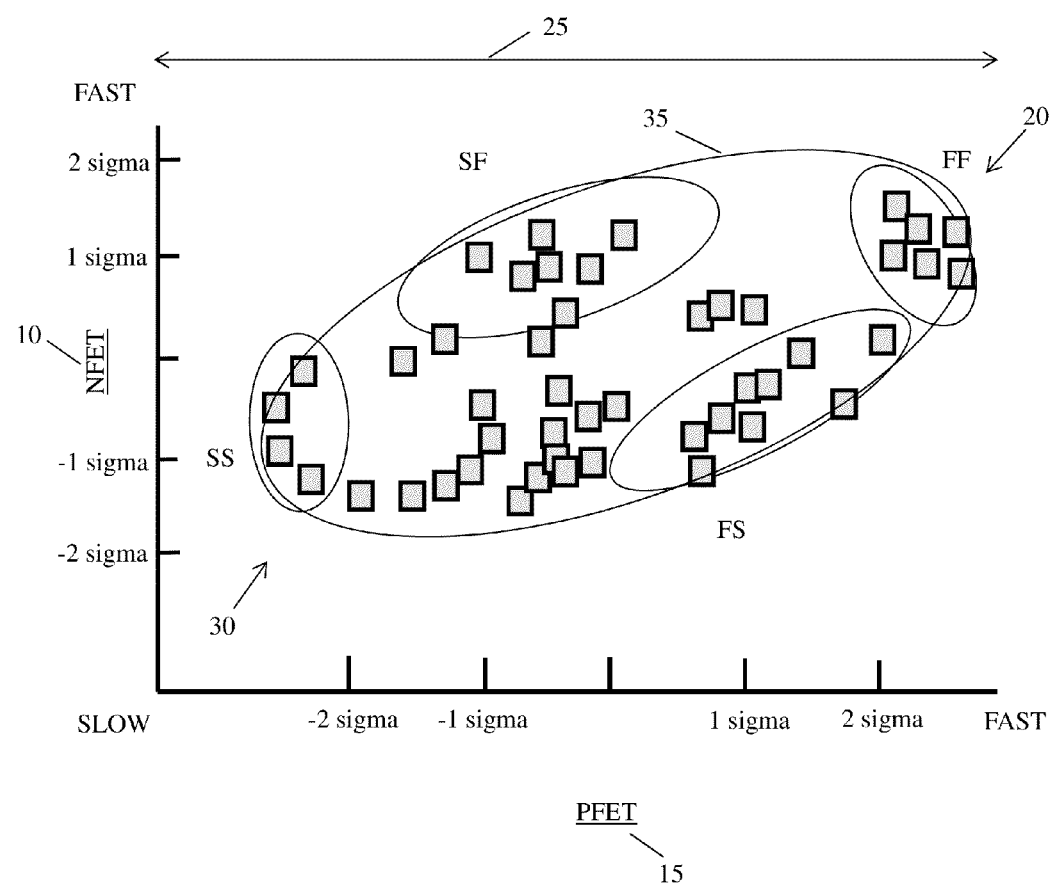
FIG. 1 is a chart illustrative of a process distribution for a library element in accordance with aspects of the invention.

FIG. 1 illustrates the challenges discussed herein of scaling and designing library elements or products for newer technology nodes (e.g., 22 nm technology) while meeting performance requirements at technology minimum or lower voltages. As should be understood, a library element may be a set of devices (i.e. transistors, diodes, resistors, capacitors, and inductors) wired together in a circuit, which perform a function. The n-type devices 10 and p-type devices 15 of the library elements or products may be scaled and fabricated over a wide process distribution due to process variation such that at one end 20 of the process distribution 25 the n-type devices 10 and p-type devices 15 may be characterized as fast and at the other end 30 of the process distribution 25 the n-type devices 10 and p-type devices 15 may be characterized as slow (i.e., beyond nominal). Specifically, FF (i.e., fast/fast) represents the fast n-type devices 10 and fast p-type devices 15 process corner, and SS (i.e., (slow/slow) represents the slow n-type devices 10 and slow p-type devices 15 process corner. These outliers are typically limited from the overall manufacturing yield using performance screen ring oscillators (PSROs).

On the other hand, SF (i.e., slow n-type devices/fast p-type devices) and FS (i.e., fast n-type devices/slow p-type devices) represent process corners where n-type devices 10 to p-type devices 15 skew issues typically occur. As should be understood, the n-type devices 10 and p-type devices 15 at these process corners are proceeding in different directions (i.e., n/p skew) generating outliers beyond nominal. These outliers are conventionally limiting on the minimum voltage obtainable for the entire yield area 35 because they require designers to redesign the library elements and products to close timing for the SF and FS process corners using buffers and modified circuits (e.g., switching elements with altered doping, channel sizes, or the oxide thickness). However, as discussed above, this has lead to a substantial increase of leakage current, which causes the redesigned devices to require higher power to replace the leaked current. Accordingly, aspects of the present invention discussed in further detail herein provide for the ability to constrain the yield area 35 to a smaller area (e.g., a narrower n/p skew) such that it is easier to meet the performance requirements in the constrained FS and SF process corners with a lower voltage.

Figure 2:
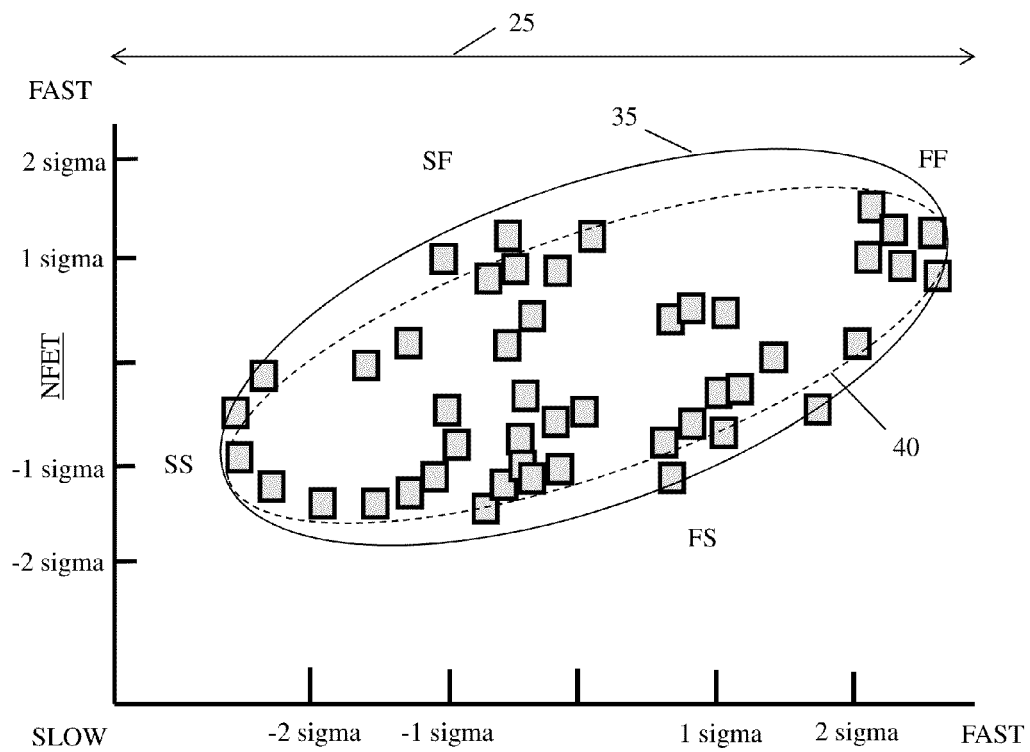
FIG. 2 is a chart illustrative of a constrained process distribution for a library element in accordance with aspects of the invention.

FIG. 2 illustrates an exemplary constraint placed on the yield area 35 in accordance with aspects of the present invention to achieve a constrained yield area 40 to limit pieces of the process distribution 25 and obtain a design capability. Specifically, the constrained yield area 40 shows a narrower n/p skew disposition with a small amount of the process distribution 25 (i.e., yield loss) outside of the tightened limits. In embodiments, the tighter n/p skew disposition can be set up as a function of the process distribution (e.g., as a function of voltage). The tighter disposition for the n/p skew may be applied to part of a Gaussian manufacturing distribution where most library elements or products are manufactured (e.g., middle of the process distribution 25) but still achieve a small yield loss.

Advantageously, application of the tighter skew disposition in accordance with aspects of the present invention results in being able to meet functionality or performance at a lower voltage. The achievement of lower voltages with similar functionality or performance also means lower power requirements for the library elements or products since active power is a function of voltage squared and leakage current is also lower at lower voltages. In embodiments, library elements or products that cannot meet the tighter skew disposition may still be used in higher power budget or lower performance applications, eliminating cost implications. Optionally as discussed further herein, the constraint techniques illustrated in FIG. 2 may be used in conjunction with selective voltage binning in order to run faster library elements or products at lower voltage and slower library elements or products at higher voltage, and thus further reduce the maximum power for the distribution of library elements or products.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
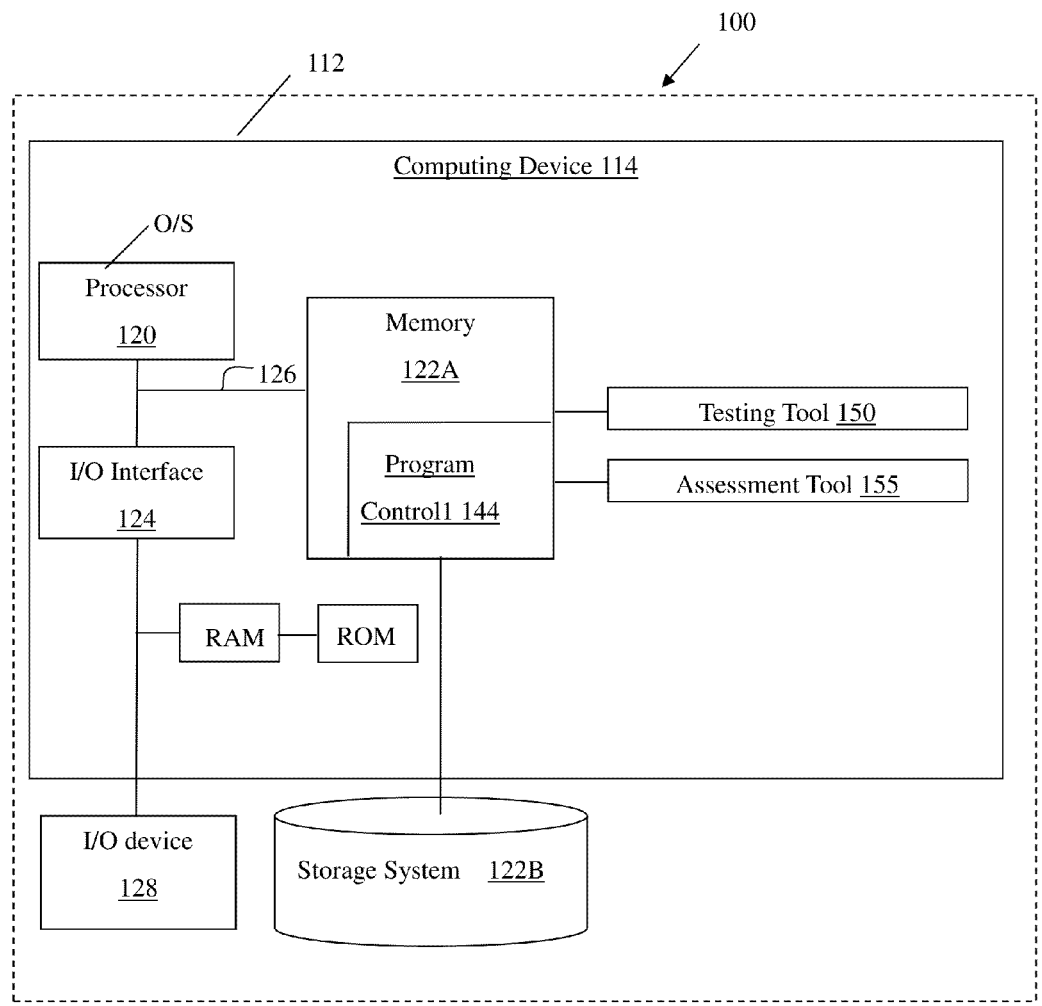
FIG. 3 is an illustrative external environment for implementing the invention in accordance with aspects of the invention.

FIG. 3 shows an illustrative environment 100 for managing the processes in accordance with the invention. To this extent, the environment 100 includes a server or other computing system 112 that can perform the processes described herein. In particular, the server 112 includes a computing device 114. The computing device 114 can be resident on a network infrastructure or computing device of a third party service provider (any of which is generally represented in FIG. 3).

The computing device 114 also includes a processor 120, memory 122A, an I/O interface 124, and a bus 126. The memory 122A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 114 is in communication with the external I/O device/resource 128 and the storage system 122B. For example, the I/O device 128 can comprise any device that enables an individual to interact with the computing device 114 (e.g., user interface) or any device that enables the computing device 114 to communicate with one or more other computing devices using any type of communications link. The external I/O device/resource 128 may be for example, a handheld device, PDA, handset, keyboard, etc.

In general, the processor 120 executes computer program code (e.g., program control 144), which can be stored in the memory 122A and/or storage system 122B. Moreover, in accordance with aspects of the invention, the program control 144 controls a test tool 150 and/or an assessment tool 155 to perform the processes described herein. The test tool 150 and the assessment tool 155 can be implemented as one or more program code in the program control 144 stored in memory 122A as separate or combined modules. Additionally, the test tool 150 and assessment tool 155 may be implemented as separate dedicated processors or a single or several processors to provide the function of these tools. While executing the computer program code, the processor 120 can read and/or write data to/from memory 122A, storage system 122B, and/or I/O interface 124. The program code executes the processes of the invention. The bus 126 provides a communications link between each of the components in the computing device 114.

In embodiments, the test tool 150 can be used to set device skew requirements, set device skew dispositions by process bin or other PSRO type identifiers, and allow for the design of library elements or chips using device skew assumptions. For example in accordance with aspects of the invention, the test tool 150 can set n/p skew requirements for devices of library elements and chips, set an n/p skew test disposition by bin or identifier as a function of the PSRO, and design the library elements or chips using n/p skew assumptions.

In embodiments, the assessment tool 155 can be used execute the design of the library elements or chips, receive performance and skew data, and effect shipment of product based on the received performance and skew data. For example, in accordance with aspects of the invention, the assessment tool 155 can execute the design of the library elements or chips using n/p skew assumptions to fabricate the library elements or chips, receive performance data from the fabricated library elements or chips, bin the library elements or chips based on the performance data, test the binned library elements or chips to determine the actual n/p skew of each library element or chip, and effect shipment of product that meets the set device skew requirements.

Figure 4:
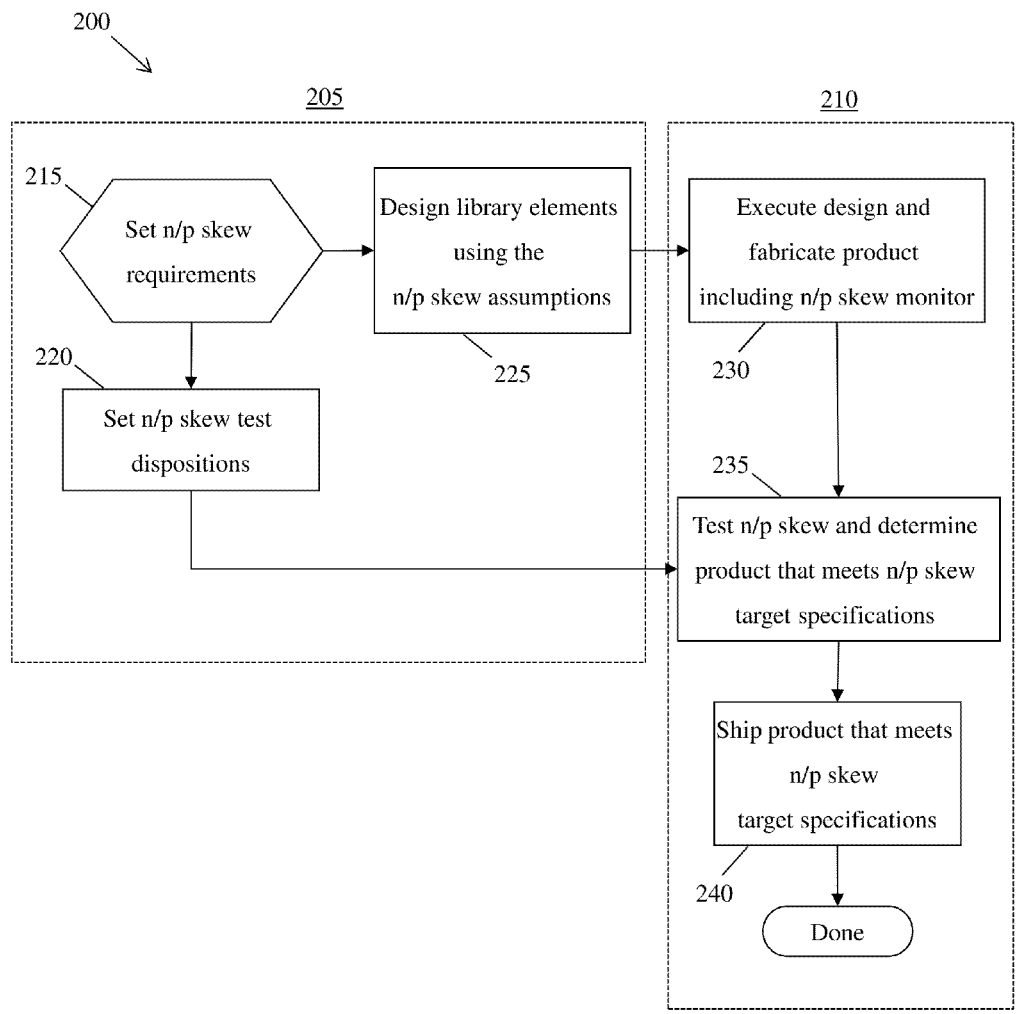
FIG. 4 is an illustrative process flow of implementing the system in accordance with aspects of the invention.
Figure 6:
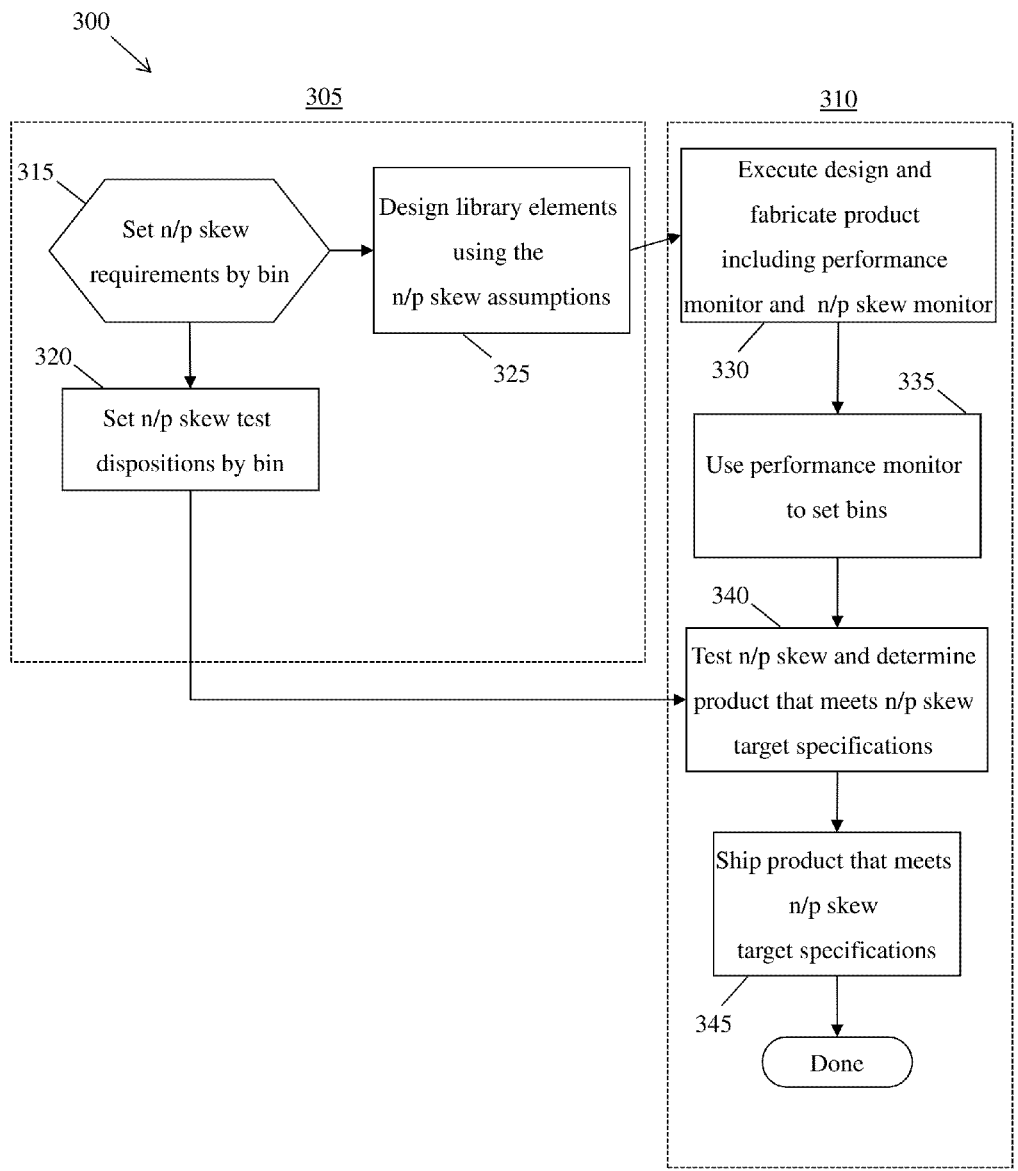
FIG. 6 is an illustrative process flow of implementing the system in accordance with aspects of the invention.

FIGS. 4 and 6 show exemplary flows for performing aspects of the present invention. The steps of FIGS. 4 and 6 may be implemented in the environment of FIG. 3, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 4 shows a process 200 for narrowing process corners of a process distribution for at least one library element or product to constrain the design and fabrication of the at least one library element or product at a lower voltage while achieving a similar performance at a lower power. In embodiments, the process 200 may comprise a design phase 205 configured to set a N-type device to p-type device skew (i.e., n/p skew) and control design of the at least one library element or product based on device skew, and a fabrication phase 210 configured to control fabrication and shipping of at least one library element or product based on performance of the device and the n/p skew. As should be understood, in embodiments, the processes of design phase 205 may be implemented by test tool 150 (as discussed with respect to FIG. 3) and the processes of fabrication phase 210 may be implemented by assessment tool 155 (as discussed with respect to FIG. 3). However, in alternative or additional embodiments, the processes of design phase 205 and fabrication phase 210 may be performed on a single processor or tool (e.g., the test tool 150) or split into various conceivable processes implemented on multiple processors or tools (e.g., test tool 150 and assessment tool 155) without departing from the spirit and scope of the present invention.

At step 215, device n/p skew requirements for at least one library element of a product may be set. In embodiments, this may include setting n/p skew requirements as a design point such that the at least one library element can be designed to meet performance in one or more constrained process corners at a lower voltage. For example, the n/p skew requirement may be set by initially setting maximum and minimum performance limits for n-type devices and p-type devices, and then using those limits to calculate a range of acceptable ratios for n-type devices to p-type devices skew. To set the ratio, the parameter to be measured ($I_{on}$, VT, etc.) is selected and the measurement macro (which may be put in every product chip) is designed. The ratio is calculated by dividing the parameter value for the n-type by the parameter value for the p-type measurement. While parameter values corresponding to a process sigma value are typically used, it may also be possible to create ratios that apply process sigma values. For example, ratios may be individually set for each part of the process window within the allowed process distribution. In embodiments, the set limits and calculated range of ratios may be designed to constrain at least one process corner (e.g., the FS process corner) of the normal process distribution for the at least one library element in such a manner that the width of the normal process distribution is narrowed. In other words, the set limits and calculated range of ratios may be designed for each process corner (e.g., SF and FS process corners) at a point or sigma where a yield loss is acceptable while still achieving performance at lower voltages.

In additional or alternative embodiments, the set limits and calculated range of ratios may be designed to be the same or different for each of the process corners (e.g., SF and FS process corners) in such a manner that the width of the normal process distribution is narrowed. Consequently, the narrowing of the normal process distribution reduces the limitations placed on the minimum voltage achievable via a larger process distribution that includes library elements with too large of an n/p skew for achieving the minimum voltage without redesign or modification (e.g., modulation of the voltage) of the library elements. The set n/p skew requirements may then be placed into the target specifications (i.e., the spec).

At step 220, device skew test dispositions may be set based on the set n/p skew requirements. In embodiments, the n/p skew test dispositions may be set as a function of the process distribution to match design criteria limits imposed by the set n/p skew requirements. For example, the device skew test dispositions may be set as a function of voltage, voltage and temperature, temperature, other parameters individually or in combination, etc.

In embodiments, the setting the n/p skew test dispositions may include setting up a different n/p skew disposition requirement at different points within the process distribution. Library elements that are very slow or very fast (e.g., at the SS and FF corners of the process distribution) may have a limit set where n/p skew is very close together (lower n/p value) and not impact product yield. Library elements that are around nominal (e.g., at the SF and FS corners of the process distribution) may have a higher allowed n/p ratio since a tighter ratio would result in significant yield fallout. Accordingly, as the process distribution shifts to the slow side or the fast side, the n/p ratio may be adjusted such that all products are contained within the ellipse (shown in FIG. 2 as the constrained yield area 40) allowed for the product.

Figure 5:
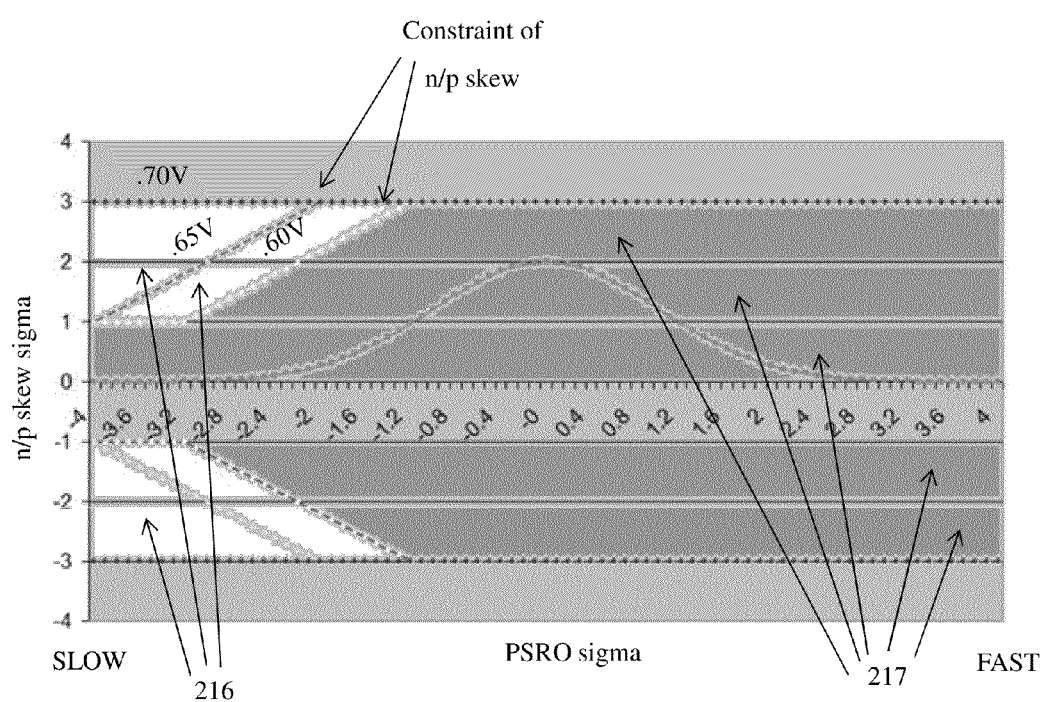
FIG. 5 is a chart illustrative of a methodology for setting n/p skew requirements and dispositions in accordance with aspects of the invention.

FIG. 5 is a chart illustrating the concept of setting the n/p skew requirements and test dispositions as discussed with respect to steps 215 and 220. Specifically, FIG. 5 shows that a set n/p device skew requirement of +/−3 sigma allows for all product manufactured across a process distribution to achieve a minimum voltage requirement of 0.70V. However, constraining the n/p device skew requirements for example to meet smaller voltage requirements (e.g., 0.65V and 0.60V) changes the number product manufactured across the process distribution capable of achieving the smaller voltage requirements. In accordance with these aspects of the present invention, the n/p skew dispositions perform as a screen for eliminating a small yield percentage 216 of library elements or products that have too large of an n/p skew while at the same time allowing a larger yield percentage 217 of library elements or products to be designed, fabricated, and shipped with improved low voltage operation and low power requirements.

At step 225, the at least one library element of the product may be designed using n/p skew assumptions that are based on the set n/p skew requirements. In embodiments, the assumptions comprise the n/p skew requirements (i.e., the range of acceptable ratios for n-type devices to p-type devices skew) and additional performance data for the n-type devices and p-type devices (e.g., the maximum and minimum performance limits). In accordance with aspects of the invention, the at least one library element is capable of being designed without using buffers and modified circuits (e.g., switching elements with altered doping, channel sizes, or the oxide thickness) because of the constraints imposed by the n/p skew assumptions. In other words, the at least one library element is being design in an environment or process distribution constrained by the n/p skew assumptions.

At step 230, the design of the library elements may be executed to fabricate a product in accordance with target specifications of the design. In embodiments, the fabrication of the product may include forming at least one device skew monitor (e.g., scaling parametric macros, see, e.g., U.S. Pat. No. 7,382,149, issued on Jun. 3, 2008, which is incorporated herein by reference in its entirety) within the library elements or product. The skew monitors may be configured to measure the performance of each of the n-type devices and the p-type devices, generate performance data, and optionally calculate a difference or ratio in the performances using the performance data to obtain an actual n/p skew of the fabricated product.

At step 235, each fabricated product may be tested to obtain the actual n/p skew of the product, and the actual n/p skew may be used to determine product that meets n/p skew target specifications. In embodiments, this may comprise either: (i) receiving performance data from the device skew monitors implemented on each product and calculating a difference or ratio in the performances of the n-type device and p-type devices to obtain an actual n/p skew of each fabricated product, or (ii) receiving the already calculated actual n/p skew of each fabricated product from the device skew monitors.

Additionally, this may comprise comparing the actual n/p skew for each product to at least one set n/p skew test disposition to determine whether the product meets n/p skew target specifications. For example, the actual n/p skew for each product may be compared to at least one set n/p skew test disposition, and when the actual n/p skew falls under or over the at least one set test dispositions a determination is made as to whether the product meets n/p skew target specifications dependent upon how the test dispositions are set. The at least on set device skew test disposition may be determined based on where the fabricated product falls within the process distribution (e.g., near nominal, or at slow or fast end of the process distribution).

At step 240, the product that meets n/p skew target specifications may be shipped to a customer. The product that does not meet n/p skew target specifications may be scraped. In embodiments, this may include scrapping all the product that does not meet the n/p skew target specifications, or the product that cannot meet the tighter skew disposition could still be used in higher power budget or lower performance applications where applicable and the remaining product scraped.

As discussed herein with respect to process 200, the concept of applying a constraint in a product manufacturing process to limit pieces of the distribution, and thus obtain a design capability may be used in conjunction with process window binning, such as selective voltage binning (SVB), systems and methods to achieve greater power and/or performance optimization. Specifically, FIG. 6 shows a process 300 for narrowing process corners of a process distribution for at least one library element or product to constrain the design and fabrication of the at least one library element or product for each process window bin (e.g., SVB bin). In embodiments, the process 300 may comprise a design phase 305 configured to set a N-type device to p-type device skew (i.e., n/p skew) by process window bin and control design of the at least one library element or product based on device skew, and a fabrication phase 310 configured to control fabrication and shipping of at least one library element or product based on performance of the device and the n/p skew. As should be understood, in embodiments, the processes of design phase 305 may be implemented by test tool 150 (as discussed with respect to FIG. 3) and the processes of fabrication phase 310 may be implemented by assessment tool 155 (as discussed with respect to FIG. 3). However, in alternative or additional embodiments, the processes of design phase 305 and fabrication phase 310 may be performed on a single processor or tool (e.g., the test tool 150) or split into various conceivable processes implemented on multiple processors or tools (e.g., test tool 150 and assessment tool 155) without departing from the spirit and scope of the present invention.

At step 315, device n/p skew requirements for at least one library element may be set by process window bin. In embodiments, this may include setting n/p skew requirements as a design point for each process window bin (e.g., 16 bins) set for process binning procedures (e.g., SVB) or PSRO identifiers. For example, SVB procedures typically use several PSRO measurements to quantify chip performance after manufacturing. Voltage binning of individual integrated circuit devices is achieved by operating the integrated circuits at a plurality of required clock frequencies, and, for each of those frequencies, determining the minimum supply voltage level that produces a pass result for a series of applied test vectors. The bin voltage establishes a minimum voltage needed for performance of the integrated circuit device at normal operating conditions. Thus, SVB is essentially an open loop technique that provides a bin identifier associated with a voltage and performance criteria for each integrated circuit device are set to define each bin identifier. Accordingly, in embodiments of the present invention, device n/p skew requirements may be set for each of the determined process window bin identifiers such that the at least one library element can be designed to meet performance in one or more constrained process corners for each bin.

For example, the n/p skew requirement for each bin may be set by initially setting maximum and minimum performance limits for n-type devices and p-type devices, and then using those limits to calculate a range of acceptable ratios for n-type devices to p-type devices skew. To set the ratio, the parameter to be measured ($I_{on}$, VT, etc.) is selected and the measurement macro (which may be put in every product chip) is designed.

The ratio is calculated by dividing the parameter value for the n-type by the parameter value for the p-type measurement. While parameter values corresponding to a process sigma value are typically used, it may also be possible to create ratios that apply process sigma values. For example, ratios may be individually set for each part of the process window within the allowed process distribution. In embodiments, the set limits and calculated range of ratios may be designed to constrain at least one process corner (e.g., the FS process corner) of the normal process distribution for the at least one library element in such a manner that the width of the normal process distribution is narrowed. In other words, the set limits and calculated range of ratios may be designed for each process corner (e.g., SF and FS process corners) at a point or sigma where a yield loss is acceptable while still achieving performance at lower voltages.

In additional or alternative embodiments, the set limits and calculated range of ratios may be designed to be the same or different for each of the process corners (e.g., SF and FS process corners) in such a manner that the width of the normal process distribution is narrowed. Consequently, the narrowing of the normal process distribution reduces the limitations placed on the minimum voltage achievable via a larger process distribution that includes library elements with too large of an n/p skew for achieving the minimum voltage without redesign or modification (e.g., modulation of the voltage) of the library elements. The set n/p skew requirements for each process window bin may then be placed into the target specifications (i.e., the spec).

At step 320, device skew test dispositions are set for each process window bin based on the set n/p skew requirements. In embodiments, the n/p skew test dispositions may be set for each process window bin as a function of the process distribution to match design criteria limits imposed by the set n/p skew requirements. For example, the device skew test disposition for each process window bin may be set as a function of voltage, voltage and temperature, temperature, other parameters individually or in combination, etc.

In embodiments, the setting the n/p skew test dispositions may include setting up a different n/p skew disposition requirement for each process window bin throughout the process distribution. Process window bins that may comprise library elements that are very slow or very fast (e.g., at the SS and FF corners of the process distribution) may have a limit set where n/p skew is very close together (lower n/p value) and not impact product yield. Process window bins that may comprise library elements that are around nominal (e.g., at the SF and FS corners of the process distribution) may have a higher allowed n/p ratio since a tighter ratio would result in significant yield fallout. Accordingly, as the process distribution shifts to the slow side or the fast side, the n/p ratio may be adjusted such that all products are contained within the ellipse (shown in FIG. 2 as the constrained yield area 40) allowed for the product.

At step 325, the at least one library element of the product may be designed using n/p skew assumptions that are based on the set n/p skew requirements for each process window bin. In embodiments, the assumptions comprise the n/p skew requirements (i.e., the range of acceptable ratios for n-type devices to p-type devices skew) and additional performance data for the n-type devices and p-type devices (e.g., the maximum and minimum performance limits). In accordance with aspects of the invention, the at least one library element is capable of being designed without using buffers and modified circuits (e.g., switching elements with altered doping, channel sizes, or the oxide thickness) because of the constraints imposed by the n/p skew assumptions. In other words, the at least one library element is being design in an environment or process distribution constrained by the n/p skew assumptions.

At step 330, the design of the library elements may be executed to fabricate a product in accordance with target specifications of the design. In embodiments, the fabrication of the product may include forming at least one performance monitor (e.g., a PSRO or some set of sample/reference logic paths) within the library elements or product. The at least one performance monitor may be configured to take measurements during testing of the library elements or product, which may be used quantify the library element or product performance after fabrication. The performance monitor measurements are essentially a statement of the aggregate effect of a wide variety of different parameters upon a circuit within the library element or product connected to the performance monitor. However, different types of circuits are typically present within a single library element or product, and some of these different types of circuits will exhibit different sensitivities to the variety of parameters. Thus, if a performance monitor is used to determine the bin voltage, there will likely be some circuits that inevitably track differently such that they are at a slightly different point in their best-case to worst-case performance range. Consequently, it is preferable to use more than one performance monitor within the library element or product to obtain a robust indication of performance for the single library element or product.

In embodiments, the fabrication of the product may also include forming at least one device skew monitor (e.g., scaling parametric macros) within the library elements or product. The skew monitors may be configured to measure the performance of each of the n-type devices and the p-type devices, generate performance data, and optionally calculate a difference or ratio in the performances using the performance data to obtain an actual n/p skew of the fabricated product.

At step 335, the at least one performance monitor may be used to set the process window bins. In embodiments, after the library elements and product have been fabricated according to the design using fabrication equipment, performance monitor measurements may be obtained to quantify library element or product performance. Based on the performance monitor measurements, a number (e.g., 16) of process window bins (SVB bins) may be identified. Each bin has a minimum requirement (e.g., voltage) for circuit performance. The requirement (e.g., voltage) for each bin may be represented by an electronic chip identification data (ECID) that may be stored on the product. Thus, the ECID value is burned into the product based on process, the customer reads the ECID (which can be tied to an input/output (IO)) to determine requirement (e.g., voltage) levels on board, and the customer handles setting corresponding input values (e.g., power supplies) differently based upon the ECID value. Further, timing closure runs may be adjusted for the process window bins. Thus, the ECID defines the performance sorting and criteria for a particular bin on each product. A portion of this information includes the identification of the cut point to supply information to an onboard management unit such as a voltage management unit.

At step 340, each fabricated product may be tested to obtain the actual n/p skew of the product, and the actual n/p skew may be used to determine product that meets n/p skew target specifications by process window bin. In embodiments, this may comprise either: (i) receiving performance data from the device skew monitors implemented on each product and calculating a difference or ratio in the performances of the n-type device and p-type devices to obtain an actual n/p skew of each fabricated product, or (ii) receiving the already calculated actual n/p skew of each fabricated product from the device skew monitors. Additionally, this may comprise comparing the actual n/p skew for each product to the set n/p skew test disposition for the process window bin upon which the product was identified as falling within at step 335 to determine whether the product meets n/p skew target specifications. For example, the actual n/p skew for each product may be compared to the set n/p skew test disposition for the process window bin indentified as being met by the performance of the product at step 335, and when the actual n/p skew falls under or over the set test disposition, a determination is made as to whether the product meets n/p skew target specifications dependent upon how the test dispositions are set.

At step 345, the product that meets n/p skew target specifications may be shipped to a customer. The product that does not meet n/p skew target specifications may be scraped. In embodiments, this may include scrapping all the product that does not meet the n/p skew target specifications, or the product that cannot meet the tighter skew disposition could still be used in higher power budget or lower performance applications where applicable and the remaining product scraped.

In accordance with these aspects of the present invention, the systems and methods of controlling device skew to meet performance requirements are hereafter discussed in detail as they pertain to the exemplary use for memory elements (e.g., SRAM). However, those of ordinary skill in the art should understand that the use of the systems and methods described herein with respect to memory elements is illustrative of one exemplary use and that other uses (e.g., other library elements or whole chips) for the systems and methods described herein are contemplated by the invention, all of which achieve similar advantages and do not depart from the scope and spirit of the invention.

Figure 7:
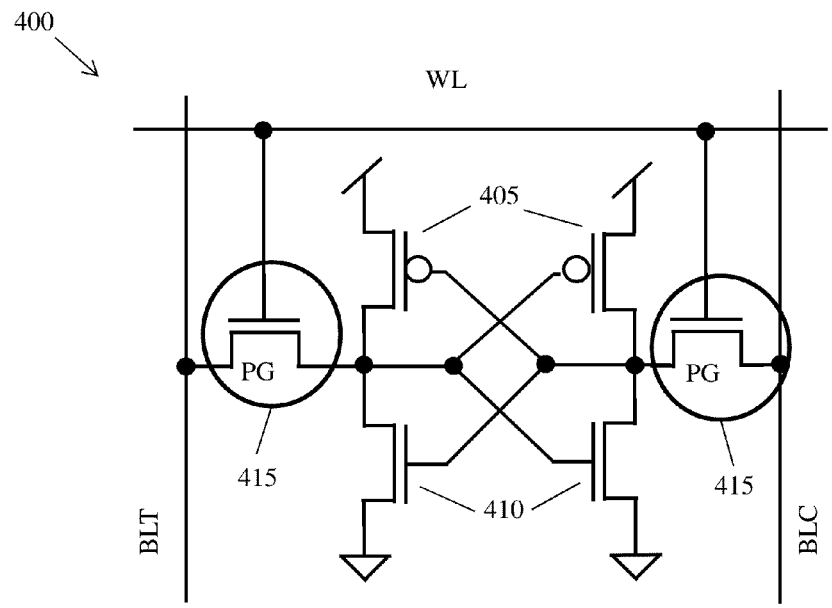
FIG. 7 shows an example of a memory element in accordance with aspects of the invention.

FIG. 7 is a diagram of a typical memory element 400, comprising p-type devices 405 and n-type devices 410. In embodiments, the p-type devices 405 and n-type devices 410 may be fabricated over a wide process distribution due to process variation such that at one end of the process distribution the p-type devices 405 and n-type devices 410 may be characterized as fast and at the other end of the distribution the p-type devices 405 and n-type devices 410 may be characterized as slow (i.e., beyond nominal). Thus, the n-type to p-type device skew (i.e., n/p skew) may be understood to be the difference between the strength of the n-type devices 410 to pull the pass gates 415 low and the strength of the p-type device to pull the pass gates 415 high. The resultant strengths of the pass gates 415 typically affect the writeability or stability (e.g., the ability of the memory cell to maintain a stored value or the likelihood that the stored value flips during a reading process) of the memory element 400.

Figure 8:
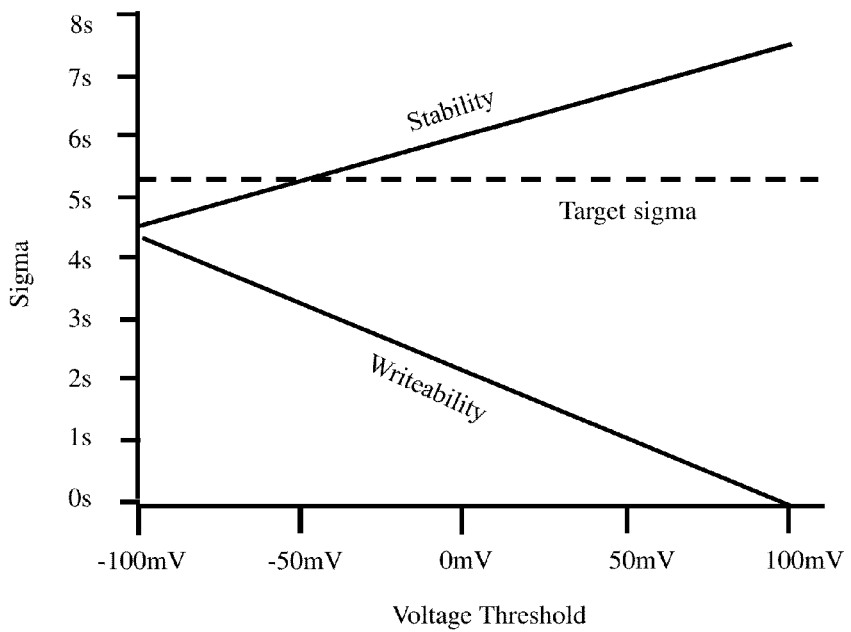
FIG. 8 is a chart illustrative of a relationship between stability and writeability for a memory element in accordance with aspects of the invention.

FIG. 8 is a chart illustrating this relationship between writeability and stability for memory elements manufactured from a common design but that are different because of different processing conditions that occur within acceptable manufacturing tolerances. Typically the strengths of the pass gates trade off stability for writeability. For example, as shown in FIG. 8, memory elements, such as static random access memory (SRAM), conventionally comprise an assist circuit that is configured to modulate the pass gates to satisfy a targeted sigma (e.g., 5.5 s) in the process distribution for both stability and writeability (i.e., modulates the tradeoff between stability and writeability) such that the SRAM works appropriately. However, as the area requirements for memory elements shrink with respect to physically smaller device requirements in smaller technology nodes, such as 22 nm technology nodes, there are a number of challenges facing designers to modulate the tradeoff between stability and writeability while burning less power or achieving lower voltage requirements.

Figure 9:
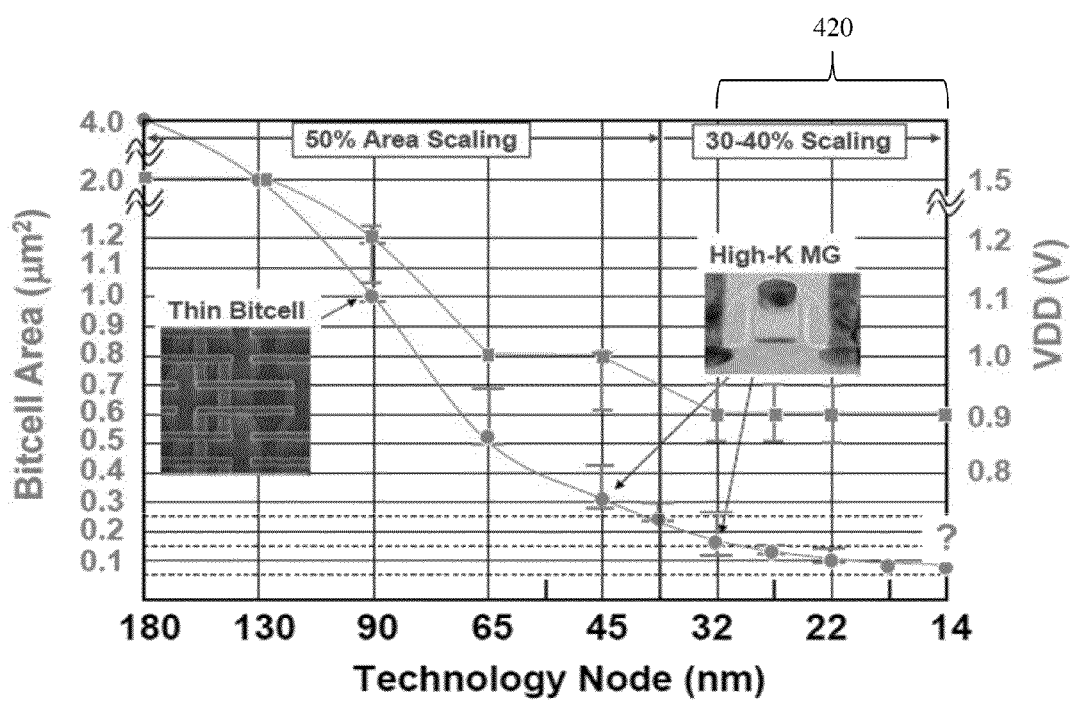
FIG. 9 is a chart illustrative of a relationship between physical area scaling and voltage scaling across technology nodes in accordance with aspects of the invention.

FIG. 9 is a chart illustrating the relationship between physical area scaling and power or voltage scaling for memory elements. Specifically, area 420 illustrates that the voltage or power requirements of memory elements within the 32–14 nm technologies has not traditionally scaled appropriately with respect to the physical area scaling of the memory element. This absence of voltage scaling is mainly attributable to the challenges inherent in meeting both stability and writeability requirements for the memory element. Accordingly, aspects of the present invention provide for the ability to control the n/p skew of devices in order to achieve these lower voltage or minimum voltage requirements and have voltage scaling track with physical area scaling of the library elements or chips across multiple technology nodes.

Figure 10:
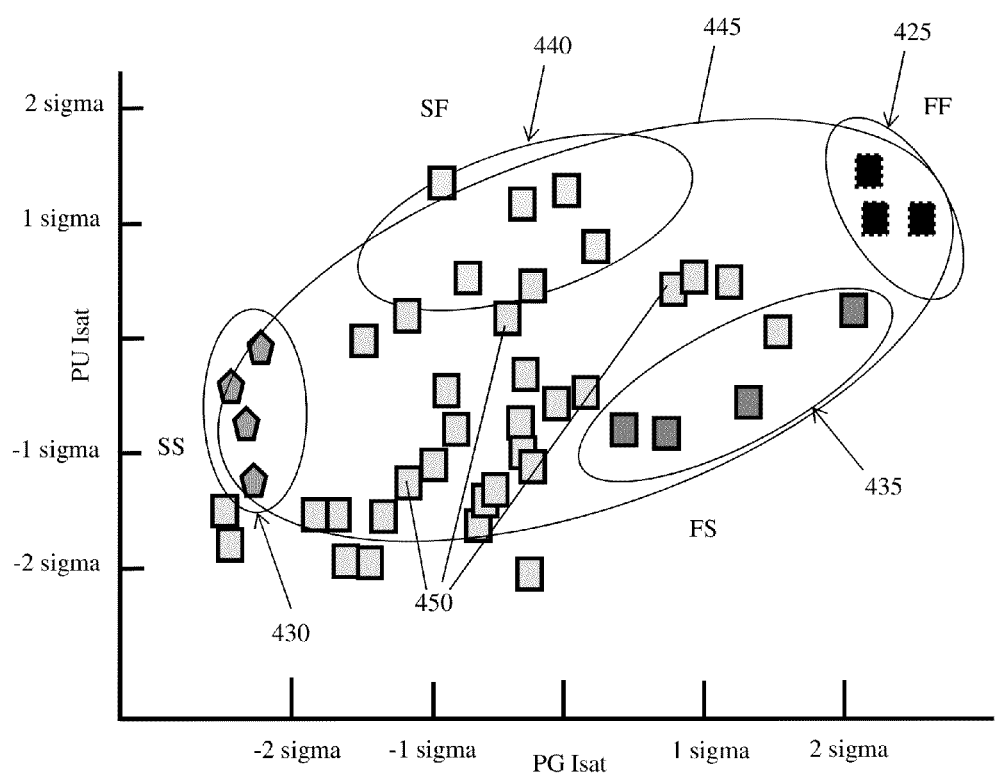
FIG. 10 is a chart illustrative of a process distribution for a memory element in accordance with aspects of the invention.

This scaling challenge is further illustrated in the chart shown in FIG. 10. For example, elements 425 and 430 represent p-type and n-type devices that demonstrate leakage and read timing limitations, respectively. Specifically, element 425 represents the fast nFET and fast pFET process corner, and element 430 represents the slow nFET and slow pFET process corner. These outliers are typically limited from the overall manufacturing yield using PSROs.

On the other hand, elements 435 and 440 represent p-type and n-type devices that demonstrate stability and writing limitations, respectively. Specifically, element 435 represents the fast nFET and slow pFET process corner, and element 440 represents the slow nFET and fast pFET process corner. As should be understood, the n-type and p-type devices at these process corners are proceeding in different directions generating outliers beyond nominal. These outliers are conventionally not limited from the overall manufacturing yield, and instead the tradeoffs between stability and writeability are modulated to achieve design requirements. However, as discussed herein, this has lead to voltage scaling issues whereby it has become difficult to achieve minimum voltage requirements at smaller technology nodes. Accordingly, aspects of the present invention provide for the ability to constrain the yield area 445 to a smaller area such that only the functional chips 450 capable of achieving these lower voltage or minimum voltage requirements are shipped to customers.

Figure 11:
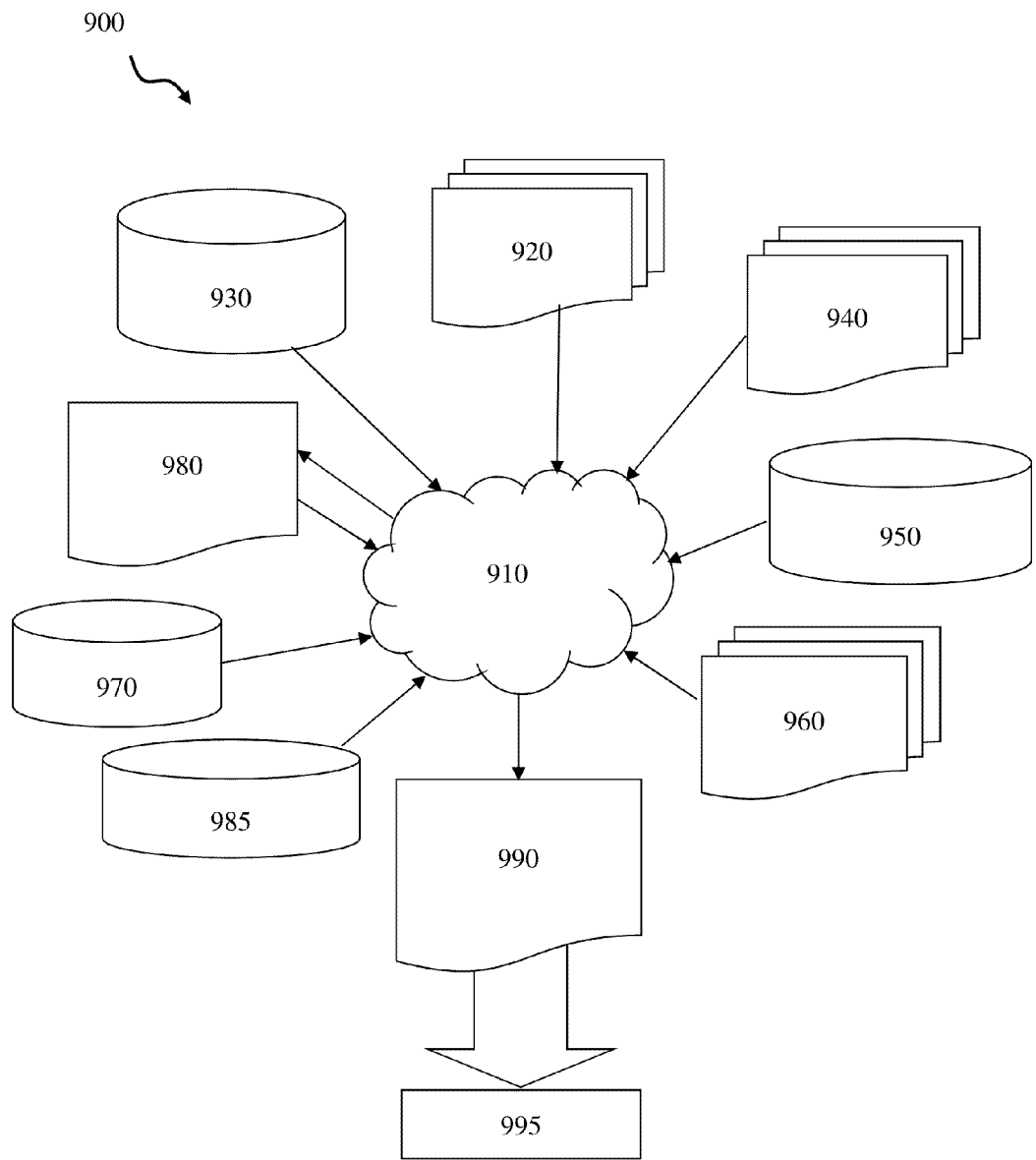
FIG. 11 is a flow diagram of a design process used in semiconductor design, manufacture, and/or test.

FIG. 11 is a flow diagram of a design process used in semiconductor design, manufacture, and/or test used with the system and method of the present invention. FIG. 11 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   setting device skew requirements for at least one library element;
   setting device skew test dispositions for the at least one library element based on the set device skew requirements;
   designing the at least one library element using device skew assumptions that are based on the set device skew requirements;
   fabricating the at least one library element on a product that includes at least one device skew monitor;
   determining an actual device skew of the fabricated at least one library element using the at least one device skew monitor; and
   determining whether the fabricated product meets target specifications based on a comparison of the determined actual device skew to the set device skew test dispositions.

2. The method of claim 1, wherein the set device skew requirements are n-type device to p-type device skew requirements and the device skew requirements are set to constrain at least one process corner of a process distribution for the at least one library element in such a manner that a width of the process distribution is narrowed.

3. The method of claim 2, wherein the set device skew test dispositions are set as a function of the process distribution to match design criteria limits imposed by the set device skew requirements.

4. The method of claim 3, wherein the function is a function of voltage, a function of voltage and temperature, or a function of temperature.

5. The method of claim 3, wherein the setting the device skew test dispositions includes setting up a different device skew test disposition at different points within the process distribution.

6. The method of claim 5, wherein the at least one device skew monitor is a scaling parametric macro.

7. The method of claim 5, wherein the determining whether the fabricated product meets target specifications includes comparing the determined actual device skew to at least on set device skew test disposition.

8. The method of claim 7, wherein the at least on set device skew test disposition is determined based on where the fabricated product falls within the process distribution.

9. The method of claim 8, further comprising shipping the product to a customer when the product meets the target specifications.

10. A method comprising:
    setting device skew requirements for at least one library element by process window bin;
    setting device skew test dispositions for each process window bin based on the set device skew requirements;
    designing the at least one library element using device skew assumptions that are based on the set device skew requirements;
    fabricating the at least one library element on a product that includes at least one performance monitor and at least one device skew monitor;
    setting a process window bin for the fabricated product using a performance measured by the at least one performance monitor;
    determining an actual device skew of the fabricated at least one library element using the at least one device skew monitor; and
    determining whether the fabricated product meets target specifications based on a comparison of the determined actual device skew to the set device skew test disposition for the set process window bin.

11. The method of claim 10, further comprising shipping the product to a customer when the product meets the target specifications.

12. The method of claim 10, wherein the set device skew requirements are n-type device to p-type device skew requirements and the device skew requirements are set to constrain at least one process corner of a process distribution for the at least one library element in such a manner that a width of the process distribution is narrowed.

13. The method of claim 12, wherein the set device skew test dispositions are set as a function of the process distribution to match design criteria limits imposed by the set device skew requirements.

14. The method of claim 13, wherein the function is a function of voltage, a function of voltage and temperature, or a function of temperature.

15. The method of claim 13, wherein the setting the device skew test dispositions includes setting up a different device skew test disposition for each process window bin identified within the process distribution.

16. The method of claim 15, wherein the at least one performance monitor is a performance screen ring oscillator and the at least one device skew monitor is a scaling parametric macro.

17. A system comprising:
    a CPU, a computer readable memory and a computer readable storage media;
    program instructions to set device skew requirements for at least one library element;
    program instructions to set device skew test dispositions for the at least one library element based on the set device skew requirements;
    program instructions to design the at least one library element using device skew assumptions that are based on the set device skew requirements;
    program instructions to fabricate the at least one library element on a product that includes at least one device skew monitor;
    program instructions to determine an actual device skew of the fabricated at least one library element using the at least one device skew monitor; and
    program instructions to determine whether the fabricated product meets target specifications based on a comparison of the determined actual device skew to the set device skew test dispositions, wherein the program instructions are stored on the computer readable storage media for execution by the CPU via the computer readable memory.

18. The system of claim 17, wherein the determining whether the fabricated product meets target specifications includes comparing the determined actual device skew to at least on set device skew test disposition.

19. The system of claim 18, wherein the at least on set device skew test disposition is determined based on where the fabricated product falls within a process distribution.

20. The system of claim 17, further comprising program instructions to direct shipment of the product to a customer when the product meets the target specifications.

\* \* \* \* \*